United States Patent [15] 3,666,813
Hindin et al. [45] May 30, 1972

[54] PROCESS FOR PREPARING AROMATIC HALOAMINES FROM AROMATIC NITROAMINES

[72] Inventors: Saul G. Hindin, Mendham; Daniel L. Bair, Roselle Park; Duane R. Steele, Newark, all of N.J.

[73] Assignee: Engelhard Minerals & Chemicals Corporation, Newark, N.J.

[22] Filed: Aug. 27, 1969

[21] Appl. No.: 853,503

[52] U.S. Cl. ...................260/580, 260/296 R, 260/518 A, 252/472, 252/474
[51] Int. Cl. ..............................................C07c 85/10
[58] Field of Search....................................260/580

[56] References Cited

UNITED STATES PATENTS 3,253,039  5/1966  Rylander et al..................260/580

Primary Examiner—Joseph Rebold
Assistant Examiner—Donald M. Papuga
Attorney—Samuel Kahn and Miriam W. Leff

[57] ABSTRACT

Process for preparing aromatic haloamines comprises hydrogenating the corresponding halogen-substituted nitroaromatic compound in the presence of a platinum group metal catalyst, said catalyst being modified with a metal selected from the group Pb, Bi, or Ag. The catalysts are effective at relatively mild conditions and the hydrogenation is effected with minimum dehalogenation.

6 Claims, No Drawings

PROCESS FOR PREPARING AROMATIC HALOAMINES FROM AROMATIC NITROAMINES

BACKGROUND OF THE INVENTION

It is known that nitro-submitted aromatic compounds can be effectively reduced to aromatic amines in the presence of various catalysts, including precious metal catalysts. However, where the nitro compound contains an aromatic halogen, reduction of the nitro group without dehalogenation presents a particularly difficult problem. The halogen is labilized by both the nitro function and by the amino function and usually extensive hydrogenolysis of the halogen group occurs during the catalytic reduction of the compound. The extent of concomitant or subsequent dehalogenation depends, among other things, on the halogen increasing generally in the order fluorine, chlorine, bromine and iodine.

Heretofore the use of special catalysts has been proposed as a method of reducing hydrogenolysis of the halogen group. Of the precious metal catalysts, it is known that palladium gives extensive hydrogenolysis whereas platinum and rhodium give less. To reduce the extent of hydrogenolysis the catalysts, particularly platinum and rhodium, have been modified. Among the catalysts proposed for this purpose, for example, are sulfided platinum catalysts, magnesium oxide or magnesium hydroxide promoted platinum catalysts, and calcium hydroxide promoted rhodium catalysts. None of the catalysts previously proposed are completely satisfactory, each having its own particular limitations. For example, in processes employing platinum on carbon in conjunction with an oxide or hydroxide of magnesium, the catalyst and additive concentrations must be maintained within narrow critical limits otherwise extensive dehalogenation occurs. Sulfided platinum, although satisfactory for certain applications has poor activity in lower temperature ranges required in some systems, such as those subject to decarboxylation or to polymerization.

It has now been found that platinum group metals modified by certain heavy metals are effective in selectively reducing halogen-substituted nitroaromatics to the corresponding amines with a minimum of hydrogenolysis of the halogen. It has also been found that these heavy metal modified catalysts are particularly effective at lower temperatures than previously practicable.

THE INVENTION

In accordance with the present invention halogen-substituted nitroaromatics are reduced to the corresponding haloamines by hydrogenation in the presence of a platinum group metal modified with a metal selected from the group lead, bismuth and silver. Preferably the platinum group metal is platinum or palladium. In preferred embodiments the catalyst is platinum or palladium modified with a heavy metal acetate, particularly lead acetate.

The modified platinum group metal is preferably supported on a carrier. Suitable carriers are carbon, alumina, barium carbonate, barium sulfate, calcium carbonate, kieselguhr, silica, and preferably the carrier is carbon. The supported catalysts used in this invention can be prepared by any of the methods known in the art. Thus, the catalysts may be prepared by precipitation or absorption, i.e. the metals may be co-precipitated or one metal may be precipitated after the other metal is absorbed on a support. The metals may also be absorbed together or one metal may be absorbed after the other is on the catalyst support. Either in the preparation or during the hydrogenation process a reductive effect on the catalyst occurs, so that the platinum group metals and the modifying metals may be wholly or partially reduced to the metal.

One suitable method for preparing the modified catalyst is as follows: To an aqueous suspension of a platinum group metal supported on a carrier, e.g. platinum on carbon, is added, while stirring, a soluble compound of lead, bismuth, or silver, e.g. lead acetate, bismuth subacetate, lead nitrate, silver nitrate, silver lactate or bismuth citrate, or mixtures thereof. The stirring is continued after the addition is complete for an interval of about 5 minutes to an hour, after which the composite is filtered and then dried overnight at about 90°–100° C. to yield the modified catalyst.

Supported platinum group metal catalysts, e.g. platinum on carbon are readily available commercially or they can be prepared by methods well known in the art for the preparation of a highly dispersed platinum group metal on a support. For example, platinum on carbon may be prepared by dispersing finely divided activated carbon in water containing a soluble platinum compound and the platinum precipitated on the carrier as the oxide or hydroxide. Then the catalyst composite is filtered, washed and dried. The platinum compound can be reduced to the free metal prior to or after washing using known reducing techniques, e.g. by treatment with formaldehyde, hydrogen, etc.

In the catalysts of this invention, the platinum group metal is present on the support in an amount of about 0.1 to 10 percent of the total catalyst weight including the support, and preferably about 1 to 8 percent by weight. The upper level of the platinum group metal is about 10 percent because of cost considerations. It has been found convenient for exemplary purposes to employ a catalyst containing 5 percent by weight platinum group metal. The modifying metal, i.e. Pb, Bi or Ag, is present in an amount of about 0.1 to 10 percent by weight based on total catalyst, and preferably about 1 to 8 percent by weight. Preferably the weight relationship of the platinum group metal to the modifying metal is about 1:0.5–2.

The catalysts may be granular, extruded or pelleted if used as stationary catalysts, as in a continuous process, or preferably powdered if used in a batch process. Generally, in the process of this invention the catalyst is employed, in batch processing in the amount of about 0.1 to 10 percent by weight, based on the weight of the halonitroaromatic substrate being treated.

The reaction temperature for hydrogenation is in the range of about 25° to 250° C., preferably about 50° to 100° C. The pressure is in the range of about 0 to 5,000 psig, preferably about 50 to 500 psig. The selection of particular reaction conditions including the temperature, pressure and catalyst concentration will vary within the aforesaid limits depending to a certain extent on the halonitroaromatics being treated. As noted above, the extent of lability of the halogen varies, for example, the bromo compounds are in general more prone to hydrogenolysis than the corresponding chloro or fluoro compounds. Also, it is well known that the lability of the halogen is dependent upon the position in the ring relative to the nitro group. Since the undesired hydrogenolysis reaction occurs more readily at high temperatures and pressures, it is preferred to employ the mildest effective conditions within the ranges taught above. It is an important feature of the catalysts used in the present invention that they exhibit high activity at relatively lower temperatures than previously known highly selective catalysts used in the process and, therefore, lower temperatures can be employed in the process than previously practicable. Other catalysts can be used at lower temperatures but they are not as selective as those of the present invention.

The selective reduction is conducted in a liquid phase solution of the halonitroaromatic dissolved in a suitable solvent. Inert organic liquids are employed as solvents. Illustrative solvents are lower aliphatic alcohols such as methanol, ethanol, isopropanol, t-butanol, hydrocarbons such as cylcohexane, octane, lower alkanoic acids such as acetic acid and propionic acid, ethers such as dioxane, and tetrahydrofuran, etc. Although reduction of the substrate will occur in the absence of a solvent, from practical considerations it is highly desirable to use one in order to improve the rate of reaction and to dissipate the heat evolved in the process. Since the halonitroaromatics are generally solids at room temperature, the use of a solvent adds to the convenience in operating the process. Generally, the concentration of solvent is varied between about 20 to 90 percent by weight solvent based on the solvent plus reactant weight. Typically the process is carried out by charging the reaction vessel with the substrate, solvent and catalyst and then passing hydrogen through the system or agitating the charge with hydrogen under pressure. The product may be separated or recovered by known methods such as fractional distillation, preparative chromatography and recrystallization.

The process of the present invention can be employed for the production of substantially any aromatic haloamine, for example, haloanilines such as o-chloroaniline, m-bromoaniline, p-fluoroaniline, 2,3-, 2,4- and 3,4-dichloraniline, and the like; haloaminophenols such as 3-bromo-, 3-chloro- or 3-fluoro-4-aminophenol, 2,3-dichloro-4-aminophenol, etc., halodiphenylamines such as 4-fluoro, 4-chloro- or 4-bromo-diphenylamine; alkylhaloanilines such as 4-chloro-2-aminotoluene, and the like, haloamino phenyl aliphatic acids such as 6-chloro-2-amino benzoic acid, etc., halonitronaphthalenes such as 1-chloro-2-nitronaphthalene, 1-nitro-2-fluoronaphthalene, etc. For the preparation of such halo-substituted aromatic amines the corresponding halo-substituted aromatic nitro compound is used.

The aromatic haloamines prepared by the present process are useful as dyes, dye intermediates, insecticides and fungicides. For example, chloroanilines are used in the preparation of azo dyes.

The invention will be further illustrated by reference to the following examples.

EXAMPLE 1

This example demonstrates the selective hydrogenation of chloronitrobenzenes to the corresponding chloroanilines in the presence of a metal acetate modified platinum metal hydrogenation catalyst. For purposes of comparison tests were conducted using a commercially available platinum on carbon catalyst, a sulfided platinum catalyst and platinum catalysts modified with bismuth, lead, silver, magnesium and copper acetates according to the method detailed below. Tests were also conducted with lead acetate modified palladium on carbon catalyst.

a. Catalyst Preparation

To 135 ml of $H_2O$ was added 15 g of 5 percent platinum on carbon. The suspension was stirred while 15 ml of a 5 percent lead acetate solution was added over about a 5 minute period. After the addition was complete the mixture was stirred for a ½ hour, filtered and then dried overnight at 110° C. to yield the modified catalyst.

In the same manner bismuth sub-acetate, silver acetate, magnesium acetate and copper acetate were employed to prepare magnesium and copper modified platinum catalysts. Also, a 5 percent palladium on carbon catalyst was modified by this general procedure.

b. Hydrogenation

The hydrogenation was conducted by charging a Pyrex test tube containing a stirring bar with 25 ml of isopropanol, 200 – 600 mg of catalyst and 10 g of the chloronitrobenzene substrate. The test tube was placed in a stirred autoclave, flushed with hydrogen and finally pressurized with hydrogen and heated. The hydrogenations generally were allowed to proceed for 20 minutes. The time when about 3 moles of hydrogen was absorbed was noted. This corresponds to theoretical formation of chloroaniline. After termination of the reaction, the catalyst was removed by filtration and the filtrate was analyzed by chromatographic techniques. Representative results are given in the Table. In tests 1 through 10, the platinum group metal catalyst contains 5 percent Pt on carbon, and in tests 11 and 12, the platinum group metal catalyst contains 5 percent Pd on carbon.

The data in the Table show that halogen-substituted nitroaromatic compounds may be selectively hydrogenated at relatively low temperature and pressure conditions in the presence of a platinum metal catalyst modified with lead, bismuth or silver acetate, to yield the corresponding halogen-substituted aromatic amines. For example, in Test No. 4 (using a prior art sulfided platinum catalyst), the time to absorb 3 moles of hydrogen per mole of substrate took over 10 times longer than that required in Test No. 6 (using a lead modified platinum catalyst of this invention), although Test No. 6 was run with ⅓ the catalyst loading and at a lower temperature.

EXAMPLE 2

In the experiment of this example the hydrogenation is carried out using the procedure and equipment described in Example 1, except that the substrate is 10.0 grams of 3-chloro-6-methoxy-2-nitropyridine and the solvent is 25 ml of acetic acid. The catalyst used is 300 mg of lead-modified platinum on carbon containing 5 percent Pt and 5 percent Pb. The test is run at 99° C. and 1,000 psig and the total absorption of hydrogen approaches 3 moles. The hydrogen is absorbed at a rate of 52 ml of $H_2$ per minute. Product analysis by gas-liquid chromatography shows over 95 percent of the corresponding 3-chloro-substituted aminopyridine and no hydrogenolysis of the halogen.

EXAMPLE 3

In the experiment of this example the hydrogenation is carried out using the procedure and equipment described in Example 1, except that the substrate is 5.0 grams of 1-nitro-5,8-dichloronaphthalene, the solvent is 30 ml of isopropanol, and the catalyst is 500 mg of a lead-modified platinum on carbon catalyst containing 5 percent Pt and 5 percent Pb. At 100° C. and 750 psig the hydrogen uptake is 173 ml per minute and hydrogenation virtually stops at an uptake of 3.0 moles of hydrogen. Product analysis by gas-liquid chromatography shows over 98 percent 1-amino-5,8-dichloronaphthalene.

What is claimed is:

1. A process 5,000 producing aromatic haloamines which comprises hydrogenating a chloronitroaromatic compound selected from the group consisting of chloronitrobenzene, dichloronitrobenzene and chloronitronaphthalene in the liquid phase at a temperature in the range of about 25° to 250°

TABLE

| Test No. | Amt. of catalyst,[1] mg. | Catalyst modifier | Halogenated nitrobenzene substrate | Press., p.s.i.g. | Temp., ° C. | Time to absorb 3 moles $H_2$/ mole substrate, min. | Total time, min. | Substituted aniline | Hydrogenolysis, percent |
|---|---|---|---|---|---|---|---|---|---|
| 1 | 300 | None [2] | 2,5-dichloro | 750 | 76 | 12 | 20 | None | 100 |
| 2 | 200 | 5% Cu | 3-chloro | 770 | 78 | 15 | 20 | do | 75 |
| 3 | 200 | 5% Mg | do | 750 | 75 | 11 | 20 | do | 80 |
| 4 | 600 | Sulfur [3] | 2,5-dichloro | 750 | 100 | 90 | 90 | >95% 2,5-dichloro | <1 |
| 5 | 300 | 1% Pb | do | 750 | 75 | 11 | 20 | 90% 2,5-dichloro | 10 |
| 6 | 200 | 5% Pb | do | 750 | 76 | 8 | 20 | 99% 2,5-dichloro | <1 |
| 7 | 200 | 1% Pb | 3-chloro | 750 | 77 | 14 | 20 | 85% 3-chloro | 15 |
| 8 | 200 | 5% Pb | do | 760 | 75 | 12 | 20 | >98% 3-chloro | <1 |
| 9 | 200 | 5% Bi | do | 750 | 75 | 9 | 20 | 95% 3-chloro | 5 |
| 10 | 200 | 5% Ag | do | 750 | 75 | 16 | 30 | do | 5 |
| 11 | 600 | None [4] | do | 750 | 77 | 2 | 15 | None | 100 |
| 12 | 600 | 5% Pb | do | 750 | 100 | 11 | 20 | 99% 3-chloro | None |

[1] Tests 1-10 contain 5% Pt on carbon and Tests 11 and 12 contain 5% Pd on carbon.
[2] Not modified—5% Pt on carbon.
[3] Commercially available sulfided Pt catalyst containing 5% Pt on carbon.
[4] Not modified—5% Pd on carbon.

C. and a pressure in the range of about 0 to 5,00 psig in the presence of a catalyst consisting of from 0.1 to 10 percent by weight, based on the total weight of catalyst, of a first metal selected from the group consisting of platinum and palladium, and from 0.1 to 10 percent by weight, based on the total weight of catalyst, of a modifying metal selected from the group consisting of lead, bismuth and silver, said first metal and said modifying metal being supported on a solid carrier and the weight ratio of said first metal to said modifying metal being from 1:0.5 to 1:2, effecting said hydrogenation until about 3 moles of hydrogen per mol of said chloronitroaromatic compound are absorbed, and recovering the corresponding chloroaromatic amine as the sole substantial product of the hydrogenation.

2. The process of claim 1 wherein said solid carrier is carbon.

3. The process of claim 2 wherein said first metal is platinum and said modifying metal is lead.

4. The process of claim 2 wherein said first metal is palladium and said modifying metal is lead.

5. The process of claim 2 wherein said first metal is platinum and said modifying metal is bismuth.

6. The process of claim 2 wherein said first metal is platinum and said modifying metal is silver.

* * * * *